Inventor:
Hendrik D. Middel,
by Harry E. Dunham
His Attorney.

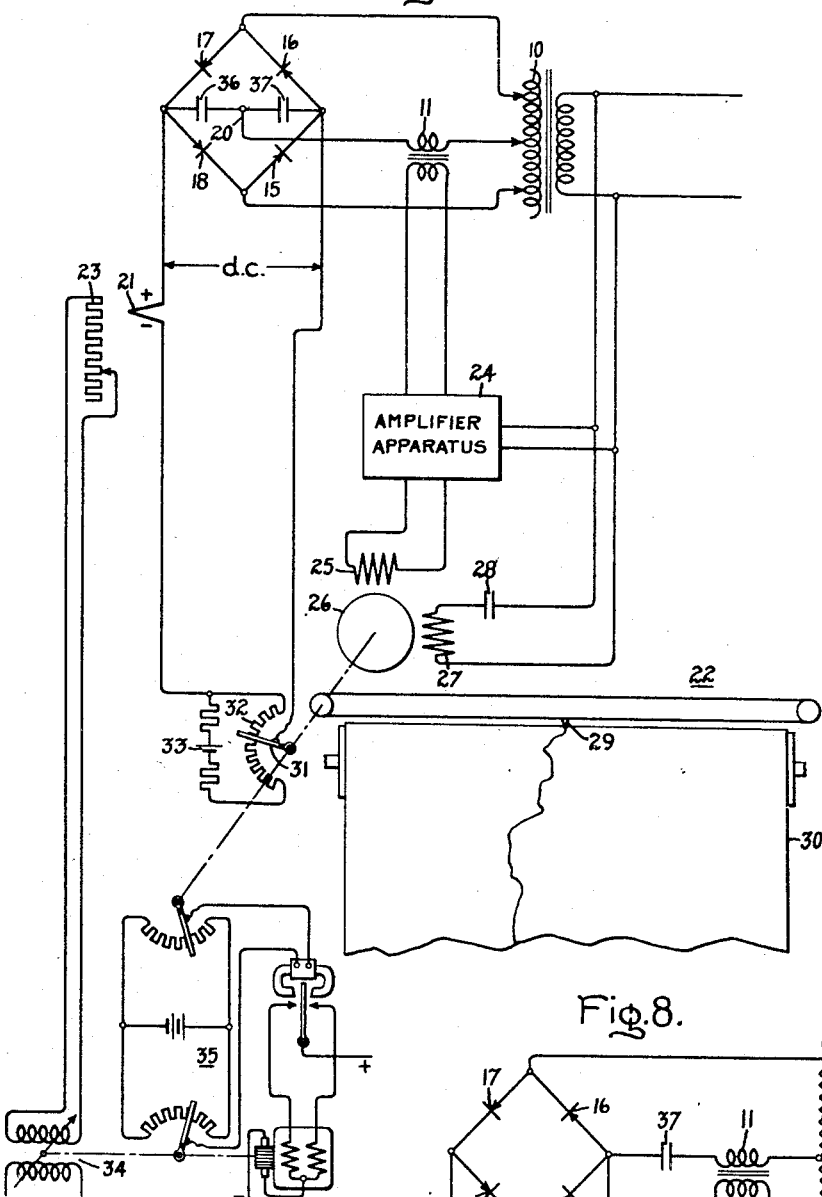
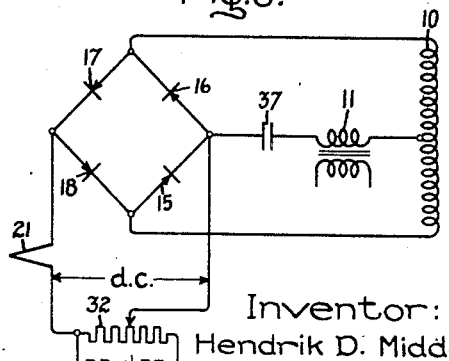
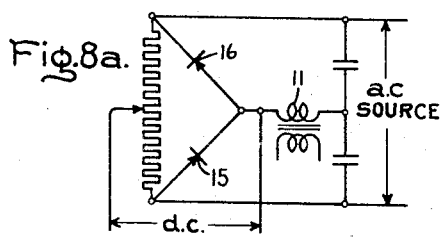

Patented Jan. 14, 1947

2,414,317

UNITED STATES PATENT OFFICE 2,414,317

RECTIFIER TYPE CONTROLLER

Hendrik D. Middel, Schenectady, N. Y., assignor to General Electric Company, a corporation of New York Application June 1, 1944, Serial No. 538,270

1 Claim. (Cl. 171—119)

My invention relates to an electrical modulating controller having an alternating current output the magnitude and phase relation of which are responsive to the magnitude and polarity, respectively, of minute direct current measurement currents. My controller is supplied by alternating current, and, in the sense that its output is controlled by a direct current, it may be considered as a modulating amplifier. An important object of my invention is to provide sensitive yet simple apparatus of the character described which requires no mechanical moving parts or sliding contacts. In carrying my invention into effect, I prefer to employ dry type rectifiers such as selenium, germanium or copper oxide rectifiers and utilize the non-linear current-resistance characteristics of such rectifiers. Thermionic rectifiers may be used where sufficient direct current detecting energy is available.

Figure 1:
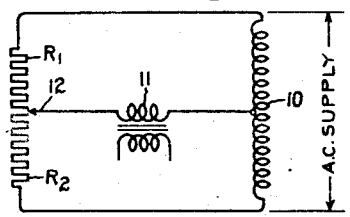
Figure 2:
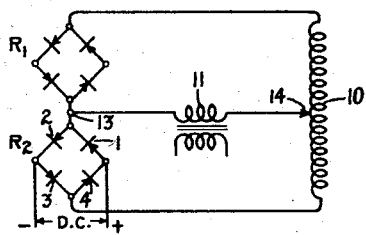
Figure 4:
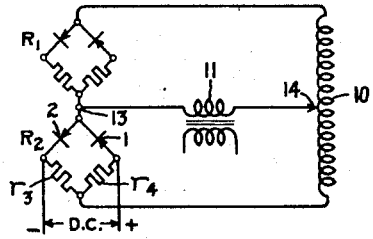
Figure 6:
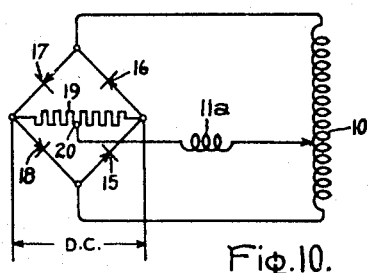
Figure 10:
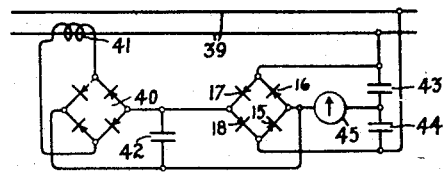
Figure 3:
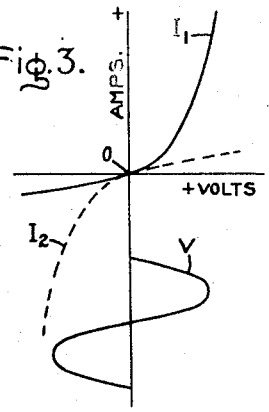
Figure 5:
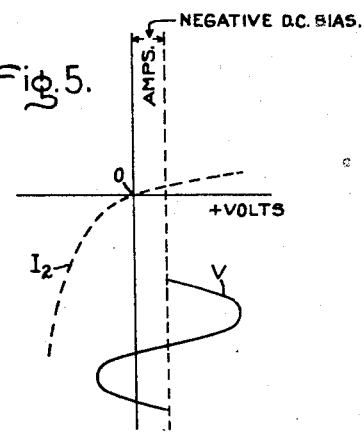
Figure 9:
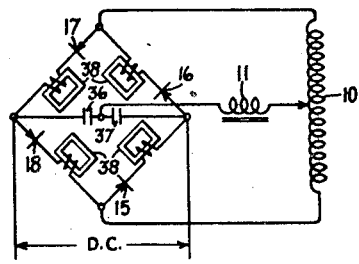

The features of my invention which are believed to be novel and patentable will be pointed out in the claim appended hereto. For a better understanding of my invention, reference is made in the following description to the accompanying drawings in which Fig. 1 represents a slide wire controller not embodying my invention but which is helpful in explaining my invention; Fig. 2 represents a voltage responsive embodiment of my invention; Fig. 3 is a curve showing the volt-ampere characteristic of a copper oxide rectifier; Fig. 4 represents a voltage and polarity responsive embodiment of my invention; Fig. 5 represents the effect of a D.-C. bias voltage on a rectifier characteristic curve which will be referred to in explaining Fig. 4; Fig. 6 represents a simplified embodiment of Fig. 4; Fig. 7 shows a more sensitive arrangement of the controller of Fig. 6 connected up for control purposes; Fig. 8 represents a simplified arrangement of the modulator of Fig. 7 using only one condenser; Fig. 8a represents a further modified arrangement of modulator; Fig. 9 shows an embodiment of the invention employing saturable core reactors; and Fig. 10 shows a voltampere meter employing my invention.

Referring now to Fig. 1, I have here represented at 10 the secondary of a transformer, or any other voltage dividing impedance such as a resistance or a reactance which is assumed to have alternating current voltage across its terminals and serving as a voltage divider. Across the terminals of 10 is connected a resistance designated $R_1$, $R_2$. An output transformer 11 is connected between the midpoint of the winding 10 and a slider 12 on the resistance $R_1$, $R_2$. If the winding 10 is tapped at its center and if the slider 12 is at the center of the resistance such that $R_1 = R_2$, no voltage will be induced in the output transformer 11. If, however, slider 12 is moved upwardly such that $R_1$ becomes less than $R_2$, a voltage will be induced in transformer 11 of a magnitude proportional to the movement of the slider 12 away from the center position. The output voltage from the secondary of transformer 11 will have a fixed phase relation with respect to the voltage of winding 10. If now slider 12 be moved downward below center such that $R_1$ becomes greater than $R_2$, we will have an output voltage from transformer 11 also proportional to the movement of the slider from the center position but which will be 180 degrees out of phase with respect to the output voltage when $R_2$ was greater than $R_1$. This is a desirable type of control for many purposes but requires mechanical operations. It is the purpose of my invention to provide a balanced alternating current network whose output and therefore balance can be controlled by direct current in such manner that the phase and amplitude of the output shall maintain the polarity sense and be some function of the applied direct current.

In Fig. 2, I have represented apparatus like Fig. 1 except that groups of dry type rectifiers such as copper oxide or selenium are substituted for the resistances $R_1$ and $R_2$ of Fig. 1, the slider 12 of Fig. 1 is replaced by a fixed connection 13 at the midpoint of the rectifier circuit between the two groups of rectifiers, and a direct current voltage designated D.-C. which may vary in magnitude and polarity is connected to one group of rectifiers as shown. The designations $R_1$ and $R_2$ are included in Fig. 2 to designate the resistances of the upper and lower groups of rectifiers. Each group of rectifiers comprises a pair connected in series in one direction and a pair connected in series in the other direction, and the two pairs connected in parallel across its half of the A.-C. supply voltage as shown. The several rectifiers are all assumed to be alike, and it will be evident that with the D.-C. voltage disconnected at zero value, effective resistances $R_1$ and $R_2$ will be equal and there will be no output voltage from the transformer 11. A slight adjustment of the tap 14 at the center of transformer coil 10 may be used to obtain a balance under this condition, if necessary.

If now a direct current voltage be applied at D.-C. of the polarity indicated, direct current will flow through rectifiers 1 and 2. It is known that the resistance of the dry type of rectifier decreases with rise in current through it or the voltage across it as represented by the current-voltage curve $I_1$ of Fig. 3. That is, the copper oxide rectifier and dry type rectifiers generally have a so-called threshold value of resistance considerably higher than the resistance for higher current flow, and this characteristic is nonlinear as indicated by the shape of curve $I_1$ which shows that the current flow rises more rapidly than the rise in voltage. The direct current flowing through rectifiers 1 and 2 of the lower group in Fig. 2 decreases their resistance, and as a result, more alternating current will flow in both directions through the lower group of rectifiers than through the upper group of rectifiers, or $R_2$ becomes less than $R_1$, and is the equivalent of moving the slider 12 of Fig. 1 downward from center to produce a current flow in the output transformer 11. While a transformer at 11 is not essential, it is desirable for voltage and impedance gain where subsequent amplification is to be used. Also the output of transformer 11 will increase and decrease with increase and decrease of the D.-C. voltage and current. In Fig. 3 let $I_1$ represent the voltage-current curve of rectifier 1, Fig. 2, and the reverse dotted line curve $I_2$, Fig. 3, represent the voltage-current curve of rectifier 2, Fig. 3, with respect to the constant alternating current voltage applied which may be represented by the curve V, and we see that the resistance of rectifier 1 is materially decreased in relation to the resistance values of the other rectifiers during the positive half-cycle of alternating current voltage, while during the reverse half-cycle the resistance of rectifier 2 is correspondingly decreased. The fact that now more A.-C. current also flows through rectifiers 4 during the positive half-cycle and through 3 during the negative half-cycle than through any of the rectifiers of the upper group also helps to make $R_2$ less than $R_1$ and augments the response obtained. If now the polarity of the D.-C. voltage be reversed, the direct current will flow through rectifiers 3 and 4 and the same result will be obtained. That is, $R_2$ is decreased in comparison to $R_1$ and here again we have the result obtained by moving tap 12 downward in Fig. 1. Thus, reversing the polarity of the D.-C. voltage in Fig. 2 does not reverse the phase relation of the A.-C. output voltage of transformer 11 although a good D.-C. to A.-C. amplification response is obtained.

In Fig. 4, I show a modification of Fig. 3 where the A.-C. output voltage phase relation does reverse with reversal in polarity of the D.-C. voltage. In Fig. 4 rectifiers 3 and 4 of Fig. 2 and the corresponding rectifiers in the upper group have been replaced by resistance $r_3$ and $r_4$.

In Fig. 4 when the D.-C. polarity is that represented, the action is essentially like that of Fig. 2, where direct current flows in rectifiers 1 and 2 and decreases their resistances, causing $R_2$ to be less than $R_1$ although some direct current may also flow through resistances $r_4$ and $r_3$ of the lower group at this time. Now when the polarity of the D.-C. voltage is reversed, it has the effect of increasing the resistance of rectifiers 1 and 2 to the flow of the alternating current so that $R_2$ is increased in comparison to $R_1$ under these conditions. The conditions during the negative half-cycle of alternating current where the alternating current is assumed to be flowing downward through rectifier 2 are pictured in Fig. 5. The negative half-cycle of the alternating current shown at the left in Fig. 5 in attempting to flow through rectifier 2, Fig. 4, meets the opposed D.-C. voltage bias indicated, and the result may be pictured by moving the A.-C. voltage curve V over to the right or positive side of the zero current line of the diagram in relation to the characteristic current curve $I_2$ of the rectifier. So far as the opposed voltages on rectifier 2 are concerned, during the negative half-cycle the current attempts to flow first in one direction and then in the other through such rectifier and is not sufficient even at the left-hand peak of the A.-C. voltage wave to reduce the resistance of the rectifier much below the high threshold value. Hence in Fig. 4 the effective resistance of $R_2$ is less than $R_1$ when the D.-C. bias voltage is positive and is greater than $R_1$ when the D.-C. bias is negative, and has the same effect as moving the tap 12, Fig. 1, first downward from center and then upward from center and reverses the phase relation of the output voltage of the transformer 11 with reversal in D.-C. polarity. Also, the output voltage of transformer 11 varies with the D.-C. bias voltage. It should be noted that while rectifiers are used there is in fact no rectification of the alternating current since the rectifiers are parallel connected with respect to the alternating current and function merely as symmetrical but nonlinear resistances. In Fig. 4 there exists an alternating voltage across the direct current terminals when the direct current input is zero. This condition is avoided in Fig. 6.

In Fig. 6, I have shown an improved and simplified embodiment of such controller. In Fig. 6 rectifiers 15 and 16 connected in series across the A.-C. supply 10 allow passage of the positive half-wave and constitute a rectified current portion of the rectifier circuit or system, and rectifiers 17 and 18 connected in series in the reverse direction across the source 10 allow passage of the negative half-wave of the alternating current. A resistance or other impedance 19 is connected between the parallel rectified circuit portions at their midpoints or between the two sets of series connected rectifiers, and a tap 20 leads from approximately the center of such resistance through the output transformer 11 to the center of supply winding or voltage dividing impedance 10. The D.-C. voltage source is connected across the resistance 19. It will now be evident that when the left-hand terminal of the D.-C. voltage is positive and the right-hand terminal negative, it will cause direct current to pass through rectifiers 18 and 15 and reduce their effective resistance, at the same time producing an opposing voltage bias to the passage of alternating current through rectifiers 16 and 17. Hence, the lower pair of rectifiers will have a low resistance and the upper pair of rectifiers will have a high resistance to the flow of alternating current, causing an unbalanced voltage in the output circuit through reactance 11a proportional to the D.-C. voltage applied. When the polarity of the D.-C. voltage is reversed, direct current will flow through rectifiers 16 and 17, producing the opposite results to those described above and reversing the phase of the output voltage of transformer 11. It will be noted that when the D.-C. bias or voltage is zero in Fig. 6, the alternating current voltage across the midpoints where the D.-C. connection is made, that is, across resistance 19, is also zero. Hence, no alternating current voltage component can be injected into the D.-C. input circuit at this time, which is a desirable feature. I have also found that when the direct current input is not zero the alternating voltage thereacross is a harmonic voltage and not the fundamental alternating current voltage. The fundamental alternating current voltage appears across each half of the resistance 19.

In Fig. 7, I have shown a still further improvement in my controller and I have shown its application to a control system. The controller of Fig. 7 is like that of Fig. 6 with the exception that a pair of similar condensers 36 and 37 replace the resistance 19. The advantage of this is that now all of the controlling direct current flows through the rectifiers 18 and 15 or through 16 and 17, depending upon the polarity, and none is lost through the cross connection. Hence, this controller, while having all of the advantages of the controller of Fig. 6, is appreciably more sensitive, or stated in another way, does not require so much direct current bias for a given output response. Thus, I have provided a controller of simple, inexpensive construction, of small size and weight, and using no moving parts in its operation, which is sensitive both to direction and magnitude of small direct current measurement voltages or currents. The value of A.-C. supply voltage and the values of the circuit elements used will be chosen to make the best use of the principles described. The exact nature of the voltage dividing impedance device 10 and the A.-C. output device 11 is not important. They may, for example, be resistances or reactances instead of transformers. Aside from converting a D.-C. input measurement voltage to proportional A.-C. output voltage having a polarity-phase directional sense, I obtain considerable amplification between the amount of D.-C. energy input and A.-C. energy output. Actually, the A.-C. output energy comes from the A.-C. source of supply which in this case is the transformer 10 and the D.-C. input voltage merely serves to control the amount and phase direction of the A.-C. output voltage.

In Fig. 7 the modulating regulator of my invention is illustrated as being used in a system where the temperature of a thermocouple 21 is recorded by a recording instrument 22 and wherein a heater 23 is also controlled in response to the temperature of the thermocouple 21. In this system the control of the A.-C. output voltage of my controller is fed through such conventional amplifier apparatus 24 as may be necessary or desirable to one winding 25 of a reversible split-phase motor 26, the other winding 27 of which is supplied from the same A.-C. source as supplies the regulator. The amplifier apparatus 24, if used, is such as will reverse the phase of its A.-C. output voltage in response to reversals of phase of its input voltage and will supply sufficient energy proportional to the input voltage from 11 to meet the requirements of the motor used at 26. Hence when the output of the transformer 11 reverses in phase, the excitation of the field winding 25 will be reversed and, moreover, will be supplied with an amount of energy which is approximately proportional to the output voltage of transformer 11. The winding 27 has a phase splitting device 28 associated with its circuit of such value as to cause the voltages on the two windings to be 90 degrees out of phase so that the motor will operate as a split-phase motor in a direction dependent upon the phase direction of the power supplied to winding 25 which, in turn, depends upon the polarity of the D.-C. voltage supplied to the controller. The power supply to winding 27 may be constant.

The motor is shown arranged to drive a recording pen 29 over a recording chart 30 and also the arm 31 of a rheostat 32 energized by a battery 33 which furnishes a balancing voltage for the circuit of thermocouple 21. The recorder and voltage balancing feature thereof are well known, and their operation will be understood by assuming, first, that the voltage of thermocouple 21 is exactly balanced by the drop in voltage across that portion of resistance 32 contained in the thermocouple circuit. Under these conditions the output voltage of transformer 11 and of amplifier 24 is zero and the motor 26 is idle. Now assume the temperature to which thermocouple 21 is subjected increases. This applies a D.-C. voltage in a given direction to my regulator and produces corresponding A.-C. outputs at transformer 11 and amplifier 24, causing field winding 25 to be energized in such a direction as to cause the motor 26 to run and move pen 29 to the right and the rheostat arm 31 counterclockwise. This increases the voltage drop furnished by the rheostat 32 in the thermocouple circuit and the action continues until the D.-C. input voltage to the rectifier control is again zero whereupon the motor 26 stops. Now assume the thermocouple voltage drops. A D.-C. voltage is now applied to the rectifier regulator which is of opposite polarity to that previously applied. This reverses the phase of the A.-C. output voltage of transformer 11 and apparatus 24, causing the motor 26 to run in the opposite direction, moving pen 29 to the left and rheostat arm 31 clockwise until the thermocouple voltage is again balanced whereupon action ceases.

At 34, I have represented a variable transformer or induction regulator included in the supply circuit of electric heater 23 which may represent an electric furnace. The thermocouple 21 may respond to the temperature of such electric furnace and the induction regulator may be controlled by the motor 26, through a usual form of follow-up, polarized relay, motor operated regulator 35 to decrease the energy supplied to the electric furnace when the temperature of the thermocouple 21 increases and vice versa. These examples of the use of my rectifier modulating regulator are merely representative of a wide variety of uses to which it may be put.

In Fig. 7 the condensers 36 and 37 prevent the flow of direct current therethrough and cause all of it to flow through the rectifier circuits. However, to prevent the flow of direct current through the cross-connection requires only one condenser. Hence, I may eliminate one of the condensers shown in Fig. 7 and simplify the modulator connection to that shown in Fig. 8. It is evident that in Fig. 8 direct current can flow only in the rectifier circuits between the D.-C. terminals. That is, it must flow through either rectifiers 18 and 15 or through 16 and 17, depending upon the D.-C. polarity. Hence, here again all of the direct current is utilized in unbalancing the resistance of the rectifier mesh. In Fig. 8 there is some greater tendency for alternating current to flow through the direct current input circuit than there is in Fig. 7 when the rectifier mesh is unbalanced, but except for a slight increase in sensitivity in favor of the circuit of Fig. 7, either circuit may be used, particularly where the D.-C. input circuit is of low impedance. The condenser 37, Fig. 8, is not essential to the operation of the circuit. For example, if in Fig. 8 the impedance of the voltage divider 10 is high as compared to the impedance of the rectifier circuits so that little of the direct current would flow in the impedance 10 in any event, the condenser 37 may be omitted. This would eliminate the time delay the condenser introduces due to charging and discharging the direct current. Also, if the alternating current output circuit impedance is high and that of the voltage divider 10 fairly low, I could connect the output terminals across the condenser 37 and eliminate the transformer 11. Also, direct current may be eliminated from the circuit in shunt to the rectifiers by using a capacitance voltage dividing impedance in place of the impedance 10 as represented in Fig. 8a. In Fig. 8a it is also noted that one of the rectifier circuits is replaced by a resistance. This circuit is operative but it is not as sensitive as the double rectifier circuit connection of Fig. 8 for example.

In connection with Figs. 6, 7, 8, 8a and 9 it is important to note that it is not essential to the operation of the circuit that there be an impedance connected across the direct current input terminals as in Figs. 6, 7 and 9, in order that the A.-C. output connection be made at the center point of such a connection. The output circuit terminal may be connected directly to the midpoint of one of the rectifier circuits at the same point where one of the direct current input terminals is connected as shown in Figs. 8 and 8a.

In Fig. 9, I have represented a further modification of my invention where a modulator like that shown in Fig. 7 has been changed by including saturable core reactors 38 in each branch of the rectifier mesh. If such reactors are designed to become saturated for the controlling current values which flow through their windings, a further increase in sensitivity becomes available. Thus when direct current flows in the two lower rectifiers 18 and 15, decreasing their resistances in the manner previously explained, the A.-C. impedance of the corresponding reactors also decreases due to saturation but without a corresponding decrease in the A.-C. impedance of the reactors associated with the upper half of the mesh, resulting in a substantially increased impedance unbalance of the mesh. This embodiment of the invention will be useful where the D.-C. circuit can supply appreciable direct current and large changes in unbalance are desired for comparatively small changes in the direct current input over a selected range. High permeability magnetic material having a low saturation value and residual will be used for the core parts of the saturable reactors.

In most of the arrangements described the A.-C. output at 11 or 11a may be kept zero by moving the tap 14 along the impedance. Hence a sensitive mill control or indicating instrument may be responsive to the output and the tap 14 adjusted to keep the output zero and the position of the tap may then be graduated in terms of the measurement desired.

In Fig. 10, I have shown an application of my invention for the measurement of volt amperes in an alternating current power circuit 39. The direct current supply to the rectifier mesh 15, 16, 17, and 18 is from a full-wave rectifier 40 supplied from a current transformer 41 connected in the power line 39. The rectified current is smoothed by a condenser 42. The rectifier mesh 15, 16, 17, and 18 is excited from the voltage of the power line 39, and a pair of condensers 43 and 44 replaces the parallel reactance 10 of the other figures. The condensers are shown in Fig. 10 to indicate that this impedance does not necessarily have to be a reactance or a resistance. An alternating current instrument 45 is connected between one of the direct current input terminals and the midpoint of the impedance comprising the condensers 43 and 44. It is evident that with this arrangement the direct current input to the rectifier mesh or modulator is proportional to the current of line 39, and that also the voltage excitation of the modulator is proportional to the voltage of the line 39. Hence, the A.-C. output will be proportional to the product of current and voltage of the power line 39 or volt amperes which are read on instrument 45. Since the current of the power circuit is rectified, the measurement is independent of power factor variations. If the current of line 39 is zero, instrument 45 will read zero because then there will be no D.-C. input to the modulator.

In accordance with the provisions of the Patent Statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

A modulator comprising an impedance and a rectifier circuit, a source of alternating current supply connected in parallel to said circuits, said rectifier circuit having alternate rectified circuit portions for allowing current to pass in opposite directions therethrough from said source, alternate current output terminals connected across midpoints in said parallel circuits across which there is normally zero alternating current output voltage, each portion of the rectifier circuit on either side of such rectifier circuit midpoint containing a rectifier and a saturable core reactor connected in series, and a direct current circuit connected across midpoints in the rectified current portions of said rectifier circuit for saturable core and rectifier impedance control.

HENDRIK D. MIDDEL.